United States Patent
Marchello

(10) Patent No.: US 6,597,636 B1
(45) Date of Patent: Jul. 22, 2003

(54) ALCOHOL-TOBACCO ELECTRONIC PERPETUAL CALENDAR

(76) Inventor: Frank T. Marchello, 21810 E. Buckskin Dr., Walnut, CA (US) 91789

( * ) Notice: Subject to any disclaimer, the term of this patent is extended or adjusted under 35 U.S.C. 154(b) by 0 days.

(21) Appl. No.: 08/826,546

(22) Filed: Apr. 3, 1997

Related U.S. Application Data

(63) Continuation of application No. 08/571,262, filed on Dec. 12, 1995, now abandoned.

(51) Int. Cl.⁷ .................. G04B 19/24; G04C 19/00; G04C 17/00
(52) U.S. Cl. ..................... 368/29; 368/82; 368/239
(58) Field of Search .................. 368/10, 28–30, 368/37, 38, 41–43, 82–84, 223, 239–242; 40/107–120

(56) References Cited

U.S. PATENT DOCUMENTS

| | | |
|---|---|---|
| 4,117,657 A | 10/1978 | Shimizu |
| 4,130,987 A | 12/1978 | Schickedanz |
| 5,696,739 A * | 12/1997 | Chang .................. 368/29 |

* cited by examiner

*Primary Examiner*—Vit Miska
(74) *Attorney, Agent, or Firm*—Rob L. Phillips; Quirk & Tratos

(57) ABSTRACT

A perpetual calendar device as set forth which continually maintains a display of the present month and day as well as the minimum birth year for an individual who is entitled to purchase alcohol or tobacco products. The displays of the birth year information can be switched back and forth between the alcohol birth year display and the tobacco birth year display as desired to prevent confusion by the clerk. The displays are identified. The device is adapted for use by store clerks and the like to check to determine whether an individual wishing to purchase these products has attained the minimum age required.

20 Claims, 2 Drawing Sheets

ALCOHOL-TOBACCO ELECTRONIC PERPETUAL CALENDAR

CROSS-REFERENCED TO RELATED APPLICATION

This application is a continuation application of application Ser. No. 08/571,262 filed Dec. 12, 1995 now abandoned and entitled Alcohol-Tobacco Electronic Perpetual Calendar.

FIELD OF THE INVENTION

The present invention relates to devices for displaying the day, month and year of the minimum age required for an individual to purchase alcohol or tobacco.

BACKGROUND OF THE INVENTION

In many jurisdictions it is illegal to sell tobacco or alcohol products to individuals who have not attained a legal age. In most jurisdictions, the legal age to purchase alcohol is 21 and 18 for tobacco products. These minimum legal ages vary from jurisdiction to jurisdiction. Sale to an under age individual can subject the vendor to fines and criminal penalties as well as civil liability. Because of the established legal minimum age requirement, store clerks and owners are required by law and often company policy to make sure, before any sale of such products, that the individual is of a legal age to purchase such products. Typically a store clerk will ask for the individual's identification such as a driver's license which shows the individual's birthdate. The clerk must then add years (21 years for alcohol and 18 for tobacco) to the birthdate and compare the derived date with the current date to determine if the individual is old enough to purchase the product. Clerks can make errors or simply not do the math so as to implement a consistent purchaser carding policy.

There is accordingly a need for a device which automatically displays the minimum birthdate of an individual entitled to purchase alcohol or tobacco products for easy comparison by the clerk to the birthdate of the individual listed on their identification card.

SUMMARY OF THE INVENTION

There is, set forth according to the present invention, a device for determining the birthdate of an individual entitled to purchase alcohol products which includes a housing, a control circuit disposed in the housing and means for supplying electrical power to the control circuit. Means are provided for inputting into the control circuit the current time and date including day, month and year, the control circuit including timepiece means for maintaining internally the current time and date. These timepiece means are perpetual taking into account leap years and the differential days of the months. A display is controlled by the control circuit to display the current day and month. The control circuit also includes means for determining from the timepiece means the birth year of an individual entitled to purchase alcohol, the control circuit including means for displaying the birth year information at the display. Accordingly at the display is displayed the continuously updated birthdate of an individual of a minimum age entitled to purchase alcohol.

The device may also include the control circuit having means to determine from the timepiece means the birth year of an individual entitled to purchase tobacco products, the control circuit displaying the tobacco product birth year likewise at the display.

Accordingly, a store clerk having the individual's identification card such as a driver's license which shows the individual's birthdate, need only compare the birthdate to the display date on the device. If the individual has a birthdate any time after the display date, the individual is not of legal age and cannot purchase the product.

BRIEF DESCRIPTION OF THE DRAWINGS

These and other features and advantages of the present invention will become appreciated with reference to the specification, claims and drawings wherein:

DESCRIPTION

Figure 1:
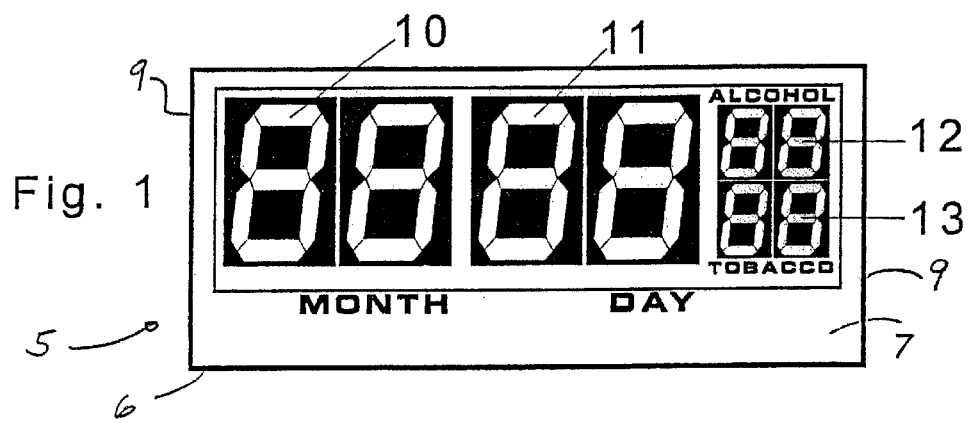
FIG. 1 is a front view of the device according to the present invention.
Figure 2:
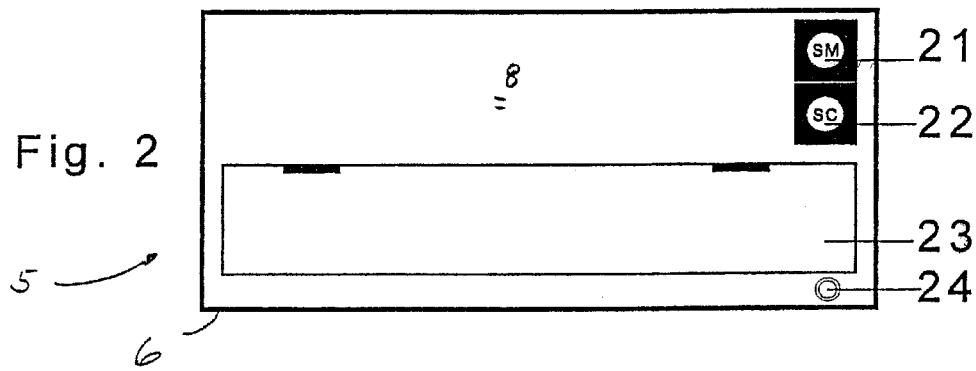
FIG. 2 is a back view of the device according to the present invention.
Figure 3:
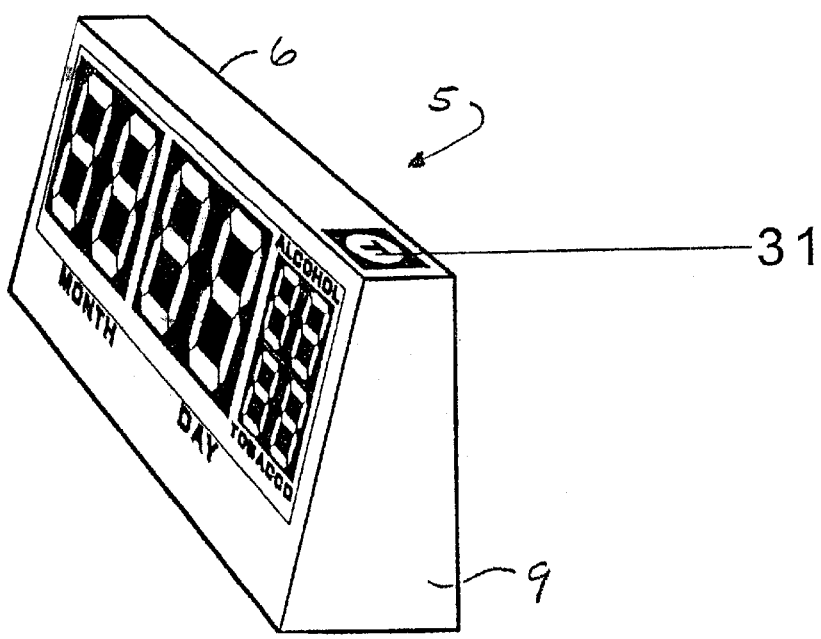
FIG. 3 is a front-side perspective view of the device according to the present invention.

Turning to the drawings, FIGS. 1–3 show a device 5 according to the present invention. The housing 6 has a front 7, rear 8 and sides 9 as shown in the drawings. While the housing 6 is shown generally as rectangular and tapered upwardly, it can have any suitable shape.

Disposed within the housing 6 is a control circuit controlling the various functions of the device as hereinafter described. Means (not shown) are provided for supplying power to the control circuit as by an external power cord.

The device 5 on the front 7 includes a display consisting of a month display 10, day display 11, alcohol birth year information display 12 and a tobacco birth year information display 13. As will hereinafter be described, the control circuitry controls the month display 10 to display the current month in a numerical mode, i.e. 01 through 12 and the day display 11 to display the current day also in a numerical mode, i.e. 01 through 31. The alcohol birth year information display 12 is controlled by the control circuitry to display the minimum birth year of an individual entitled to purchase alcohol products and the tobacco birth year information display 13 will display the minimum birth year of an individual entitled to purchase tobacco products.

To operate the device 5, the user first inputs into the control circuitry the current time. To do so the user depresses a switch mode button 21 at the rear 8 of the housing 6 causing the control circuitry to display at either of the month or day displays 10, 11 the set hour for the device 5. If the hour is incorrect, the user depresses a switch calendar button 22 also at the rear 8 of the housing 6 causing the control circuitry to sequence through the numerical hours until the correct current hour is obtained. At that point, the user releases and redepresses the switch mode button 21 causing the display to display the current minutes. To correct the minutes to the current time, the user depresses the switch calendar button 22 whereupon the control circuitry sequences through the numerical minutes until the correct minutes setting is obtained. When the correct minutes is displayed, the user releases the switch calendar button 22. To set the current seconds, the user releases and depresses the switch mode button 21 causing the displays to display the current seconds. Using the switch calendar button 22, the user, in a manner similar to that described above, inputs into the control circuitry the seconds of the current time.

To set the calendar, the user again pushes the switch mode button 21 and switch calendar button 22 in a manner described above to obtain the correct current month as displayed at the month display 10 of the device 5. Holding the switch calendar button 22 causes the control circuitry to sequence through the numerical months until the correct numerical month of the current date is obtained and shown at the month display 10. Once obtained, the switch calendar button 22 is released. To set the current day, the user again depresses the switch mode button 22 causing the display to display the day. To reset the day to the current day, the user depresses the switch calendar button 22 whereupon the control circuitry causes the display to sequence through the numerical days until the correct and current numerical day is obtained. At that point in time the user releases the switch calendar button 22. Finally, to set the current year into the device 5, the user again depresses the switch mode button 21 whereupon the current year is displayed in numerical terms, such as the last two digits of the current year. To reset the year within the control circuitry to the current year, the user depresses the switch calendar button 22 simultaneously with the switch mode button 21 whereupon the control circuitry causes the display to sequence through the numbers of the years until the current year is obtained. When the current year is displayed, the user releases both the switch mode and switch calendar buttons 21, 22. At this point in time the current time and date is inputted into the control circuitry.

The control circuitry within the device 5 automatically calculates and determines the minimum birth year of an individual entitled to purchase alcohol or tobacco products. For example, if the current date was Mar. 15, 1995, the device 5 would display at month display 10 "03" and at day display 11 "15". The alcohol birthdate information display 12, in those jurisdictions where the age required to purchase alcohol is 21, would display "74". Hence, the clerk or attendant would compare the individual's identification instrument, such as a driver's license and the birthdate thereon, to the date displayed at the device 5 to determine if the birthdate was before the displayed month, day and alcohol information displayed date "74". If the birthdate is on or before the birthdate information displayed on the device 5, the individual is entitled to purchase alcohol products. If the birthdate on the identification instrument is after the birthdate displayed, the individual is younger than 21 and hence is not entitled to purchase alcohol products.

Similarly for tobacco, in those jurisdictions where an individual must be 18 years of age to purchase a tobacco product, the date displayed at the tobacco birth year information display 13 would be "77". An individual wishing to purchase tobacco products would produce an identification card giving their birthdate and the clerk would compare it to the date displayed on the device 5. In other words, the device 5 for tobacco as well as alcohol displays the minimum birthdate required to entitle the individual to purchase such products. If the individual has a birthdate on or before the date displayed at the device 5 and for the tobacco birth year display 13, the individual is entitled to purchase such products.

While the alcohol birth year display 12 and tobacco birth year display 13 may continuously display the minimum birth year for an individual entitled to purchase such products, the device 5 may be adapted to selectively switch between the display of the birth years by use of a selector switch 31 disposed on the top of the device 5 as shown in FIG. 3. According to this embodiment, the alcohol birth year display 12 is normally on, displaying the minimum birthdate necessary to purchase alcohol products. When an individual wishes to purchase tobacco products, the attendant depresses the selector switch 31 which turns off the alcohol birth year display 12 and turns on the tobacco birth year display 13. In this manner, the clerk would not be confused as to which birth year information to refer to.

Also as shown in FIG. 1, information is provided on the device 5 to identify which birth year display is for alcohol or tobacco. As shown, the display may be written words 26 as shown. Furthermore, the device 5 may include descriptions below the month and day displays 10, 11 to clearly identify those displays.

With reference to FIG. 2, the device 5 also includes a battery case 23 enclosing batteries (not shown) for providing back-up power to the control circuit.

Accordingly, the device 5 and the timepiece feature of the control circuitry maintains the display of the current month and day on the device 5 at the month and day displays 10, 11. The control circuit takes into account leap year days thereby maintaining the current display of the present month and day at the device 5. The control circuit also maintains the proper birth year as displayed at the alcohol birth year display 12 and tobacco birth year display 13.

Depending upon the jurisdiction, the control circuit can be altered where the minimum age required for the purchase of alcohol and tobacco is different from 21 years and 18 years, respectively. This is done using the switch mode button 21.

While I have shown and described certain embodiments to the present invention it is to be understood that it is subject to many modifications without departing from the spirit and scope of the appended claims.

I claim:

1. A device for determining the birthdate of an individual entitled to purchase alcohol comprising:
   a housing;
   a control circuit disposed in the housing:
      means for supplying electrical power to the control circuit;
      means for inputting into the control circuit the current time and date including month and year, said control circuit including timepiece means for maintaining the current time and date;
   a display controlled by the control circuit to display the current day and month;
   said control circuit including means for determining from the timepiece means the birth year of an individual entitled to purchase alcohol, said control circuit including means for displaying said birth year at said display.

2. The device of claim 1 including a second display, said control circuit adapted to display said birth year information at said second display.

3. The device of claim 2 wherein said control circuit is adapted to display said birth year information as the last two numerical digits of said birth year.

4. The device of claim 3 wherein the control circuit is adapted to display said date information as numerical representations of day and month.

5. The device of claim 1 further including said control circuit is adapted to determine from said timepiece means the birth year of an individual entitled to purchase tobacco products and to display said tobacco birth year at said display.

6. The device of claim 5 including means for alternatively selecting between the display of birth year information for alcohol or tobacco.

7. The device of claim 6 including a second display adapted to display said birth year information.

8. The device of claim 6 including a second display for said alcohol birth year information and a third display for said tobacco birth year information.

9. A device for determining the birthdate of an individual entitled to purchase alcohol or tobacco products comprising:
   a housing;
   a control circuit disposed in the housing:
      means for supplying electrical power to the control circuit;
      means for inputting into the control circuit the current time and date including month and year, said control circuit including timepiece means for maintaining the current time and date;
      a display controlled by the control circuit to display the current day and month;
      said control circuit including means for determining from the timepiece means (i) the birth year of an individual entitled to purchase alcohol and (ii) the birth year of an individual entitled to purchase tobacco products, said control circuit including means for displaying said alcohol and tobacco products birth year at said display.

10. The device of claim 9 wherein said control circuit is adapted to display said birth years with said day and year.

11. The device of claim 10 further including means for selecting between the display of said alcohol and said tobacco products birth years.

12. The device of claim 11 further including means for identifying between said displayed alcohol and tobacco products birth years.

13. The device of claim 9 including a second display, said control circuit adapted to control the second display to display said determined alcohol and tobacco birth years.

14. The device of claim 13 further including means for identifying between said displayed alcohol and tobacco products birth years.

15. The device of claim 14 further including means for selecting between display of said alcohol and said tobacco products birth years.

16. A device for determining the birthdate of an individual entitled to purchase alcohol or tobacco products comprising:
   a housing;
   a control circuit disposed in the housing:
      means for supplying electrical power to the control circuit;
      means for inputting into the control circuit the current time and date including month and year, said control circuit including timepiece means for maintaining the current time and date;
      a first display controlled by the control circuit to display the current day and month;
      a second display for displaying the birth year of an individual entitled to purchase alcohol or tobacco products;
      said control circuit including means for determining from the timepiece means (i) the birth year of an individual entitled to purchase alcohol and (ii) the birth year of an individual entitled to purchase tobacco products, said control circuit adapted to control the second display to display said determined alcohol and tobacco products birth years.

17. The device of claim 16 including means for selecting at the second display between display of said alcohol and said tobacco birth years.

18. The device of claim 17 including means for identifying at the second display which of said alcohol or tobacco products birth years are being displayed.

19. The device of claim 18 including a third display, said control circuit adapted to control the second display to display the alcohol birth year and said third display to display said tobacco birth year.

20. An alcohol and tobacco age identification electronic perpetual calendar comprising:
   a housing for accommodating a control circuit board, power supply, setting buttons and a digital display;
   means for providing calendar functions;
   said display displaying said calendar functions and having a first portion for displaying a date, a first year display for identifying a legal alcohol sale, and a second year display for identifying a legal tobacco sale;
   said setting buttons being arranged to control setting of said calendar functions and said display.

* * * * *